United States Patent Office.

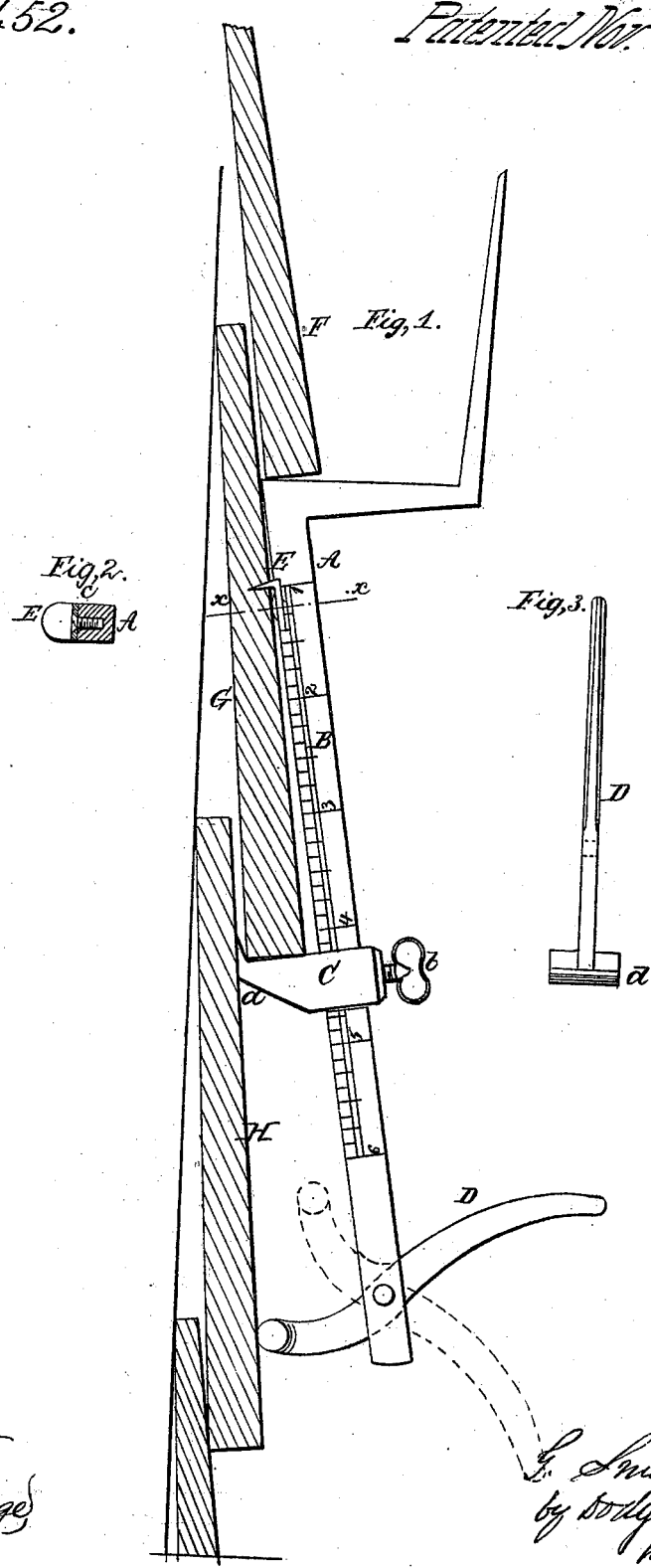

GEORGE SMITH, OF OMAHA, NEBRASKA.

Letters Patent No. 97,452, dated November 30, 1869.

IMPROVEMENT IN CLAPBOARD-GAUGE.

The Schedule referred to in these Letters Patent and making part of the same

*To all whom it may concern:*

Be it known that I, GEORGE SMITH, of Omaha, in the county of Douglas, and State of Nebraska, have invented certain new and useful Improvements in Clapboard-Gauges; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to clapboard-gauges, and consists in constructing them of a single bar, with a scale marked thereon, and connecting to this bar a prick, an adjustable hook or dog, and a lever, as hereinafter described.

In the drawings—

Figure 1 is a side view of my gauge, showing its construction and manner of operation;

Figure 2 is a cross-section on the line x-x of fig. 1; and

Figure 3 is an edge view of the lever detached.

In the construction of clapboard-gauges, it is all-important that they be so made as to be certain in their hold, easy to manage, and provided with a scale for accurate and convenient adjustment.

To produce one possessing these requisites, I make a bar, A, of malleable iron or other suitable material, in the form or shape as clearly shown in fig. 1, and mark on its side a scale, B, as shown in the same figure.

The upper end of this bar A, as shown in the figure, is bent, just above the beginning of the scale, at right angles, or nearly so, with its length, so as to form a shoulder or rest for a board, F, and then again at right angles, or nearly so, with this last bent portion, as shown in said fig. 1, so as to form a guard to prevent the board F from slipping from its rest before being nailed to its place.

Upon the bar A, I place a dog, C, so as to slide easily thereon, having provided it with a thumb-screw, b, for attaching it at any point desired, and also with a hook, a, for insertion behind the board G, as shown in said fig. 1.

The lower end of the bar A, I fork or slot, and pivot therein a lever, D, as shown in said fig. 1, and with its head d shaped as more clearly shown in fig. 3.

A short distance from the first bend or angle in the bar A, and to its front side or face, I attach a prick, E, shaped as clearly shown in figs. 1 and 2, by means of a screw, C, as shown in the same figures.

Having thus constructed my clapboard-guage, I use it as follows:

I first set the dog C on the scale, at a point distant from the upper side of the first bend in the bar A, equal to the width I propose to lay the boards "to the weather." I then lower the handle of the lever D, as shown in dotted lines in fig. 1; take hold of the gauge near its lower end with one hand, and push the hook a under the last nailed board G, and with the other draw up the handle of the lever, when its head d will be forced against the board H below the board G, and cause the prick E to be driven into the latter, and hold the gauge in position, as clearly shown in fig. 1. The clapboard F can then be placed upon it, and secured to its place, and as soon as this is done, the gauge can be released, and in like manner attached to support the next board, and so on.

My gauge, it will be seen, is very simple in its construction, and can, therefore, be furnished at a low rate. It is not liable to be broken, and is, therefore, durable. The prick E, if it should be injured, is easily replaced. No adjustments are required, except that of sliding the dog on the bar. It is certain of its hold, and can be managed without the least difficulty.

Having thus described my invention,

What I claim, is—

The clapboard-gauge and holder, as herein described, consisting of the single graduated bar B, formed with the offset at its upper end, and provided with the spur E, sliding clip C, and lever D, all constructed and arranged as set forth.

GEORGE SMITH.

Witnesses:
BYRON REED,
P. H. REED.